United States Patent
Fuhrmann et al.

(10) Patent No.: US 7,882,443 B2
(45) Date of Patent: Feb. 1, 2011

(54) METHOD FOR IMPROVING QUEUE EXPERIENCE IN A THREE-DIMENSIONAL VIRTUAL ENVIRONMENT

(75) Inventors: Oded Fuhrmann, Zichron Yackov (IL); Dan Pelleg, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 673 days.

(21) Appl. No.: 11/944,758

(22) Filed: Nov. 26, 2007

(65) Prior Publication Data
US 2009/0138807 A1    May 28, 2009

(51) Int. Cl.
G06F 3/048 (2006.01)
(52) U.S. Cl. .................. 715/757; 715/706; 705/26
(58) Field of Classification Search .......... 715/706, 715/757; 705/26
See application file for complete search history.

(56) References Cited

U.S. PATENT DOCUMENTS

| | | | |
|---|---|---|---|
| 6,901,379 B1* | 5/2005 | Balter et al. ............. 705/27 |
| 6,961,910 B2 | 11/2005 | Lee et al. | |
| 7,036,128 B1 | 4/2006 | Julia et al. | |
| 2007/0233291 A1* | 10/2007 | Herde et al. ............. 700/91 |
| 2008/0262910 A1* | 10/2008 | Altberg et al. ............ 705/14 |
| 2008/0263459 A1* | 10/2008 | Altberg et al. ........... 715/757 |
| 2008/0263460 A1* | 10/2008 | Altberg et al. ........... 715/757 |
| 2009/0124349 A1* | 5/2009 | Dawson et al. ............ 463/24 |
| 2009/0138807 A1* | 5/2009 | Fuhrmann et al. ....... 715/757 |

* cited by examiner

*Primary Examiner*—Sara England
(74) *Attorney, Agent, or Firm*—Cantor Colburn LLP; Suzanne Erez

(57) ABSTRACT

A method improving a customers experience in a queue located in a three-dimensional virtual environment is provided. The method includes the creation of computer controlled pseudo avatars that are added and removed from queues to create the perception that the queues are moving. A conversational avatar is further provided to engage the customer avatars in conversation.

4 Claims, 5 Drawing Sheets

METHOD FOR IMPROVING QUEUE EXPERIENCE IN A THREE-DIMENSIONAL VIRTUAL ENVIRONMENT

BACKGROUND OF THE INVENTION

This invention relates to a system and method for operating a three dimensional virtual environment having a plurality of queues. In particular, the invention relates to a three dimensional virtual environment having a system for improving a user's experience while waiting in the queue.

Online virtual environments that provide a three dimensional experience to the user have gained interest among consumers and business people as a commercial environment. Many collaborative virtual systems such as multi-user dungeons (MUDS) and other similar systems use avatars as a representation of the users. These avatars are a configurable graphical display that the user uses to interact with other users and the system itself. In general, the avatar can be thought of as a virtual surrogate of the user.

As the virtual environments have gained popularity and acceptance, commercial enterprises have take an interest in expanding their presence into this new marketplace. By providing a virtual store, the commercial business allows the user to experience shopping through their avatar in a familiar environment using similar paradigms to the real world. Similar to physical world environment, there are locations within the virtual store where large numbers of users congregate, a checkout line for example. Where these virtual bottlenecks occur, the queues or lines of avatars form while their users wait for their turn at receiving products or services.

Unlike a physical world queue where there are practical disadvantages to leaving, the person has already taken time and resources to physically get to the establishment for example, the nature of a virtual environment makes it easy for the user to abandon one store and with almost no effort and moments later be in a similar establishment where they can purchase the desired products and services. Thus, virtual commercial businesses need to keep wait times low to avoid losing customers.

Similar to real world businesses, a virtual commercial establishment may add additional workers, or use automation to keep the length of the queue at an acceptable level. Due to the global nature of the virtual environment, however, there are almost no limits to number of customers that may enter a virtual store since unlike the physical world, there are no physical constraints to the number of users, thus there will be periods where some type of queue is almost inevitable.

While current systems and methods for providing products and services are suitable for their intended purposes, there exists a need for improvements in managing a users experience while waiting in a queue in a virtual three dimensional environment.

BRIEF DESCRIPTION OF THE INVENTION

[To be completed once the claims are finalized]

BRIEF DESCRIPTION OF THE DRAWINGS

The subject matter, which is regarded as the invention, is particularly pointed out and distinctly claimed in the claims at the conclusion of the specification. The foregoing and other objects, features, and advantages of the invention are apparent from the following detailed description taken in conjunction with the accompanying drawings in which:

The detailed description explains exemplary embodiments, together with advantages and features, by way of example with reference to the drawings.

DETAILED DESCRIPTION

Figure 1:
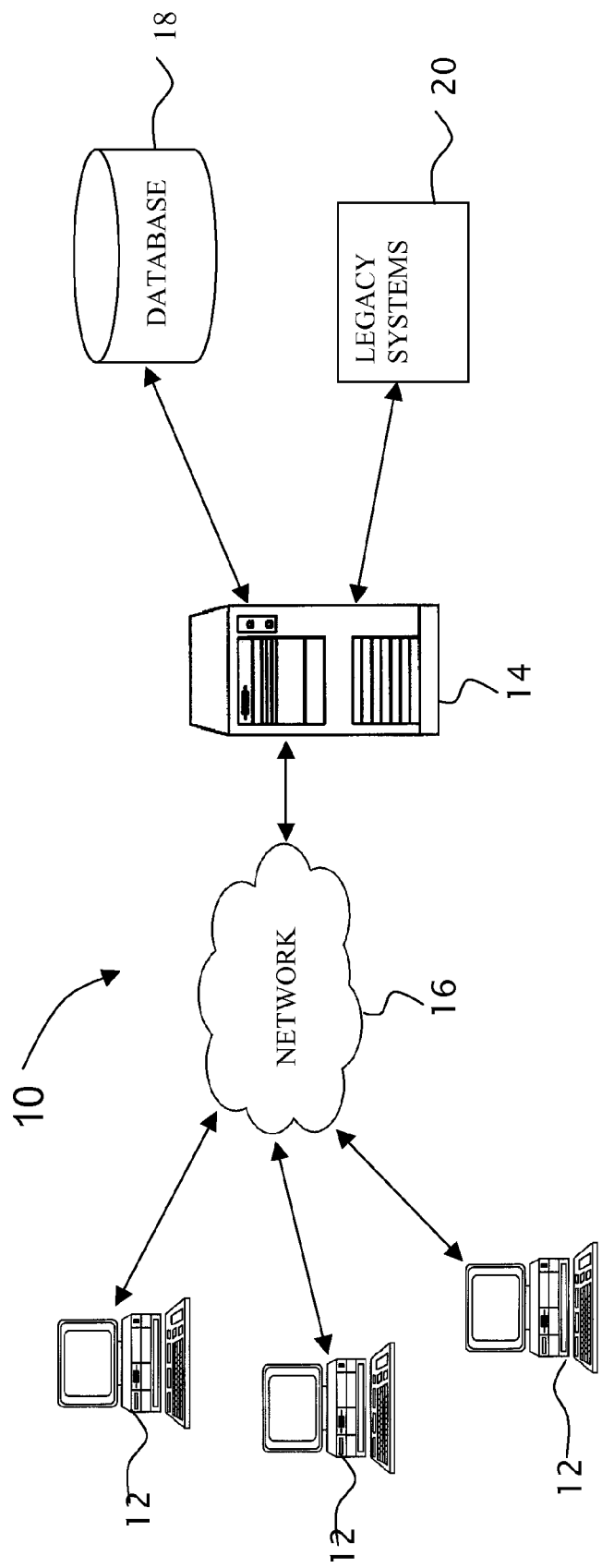
FIG. 1 illustrates a schematic diagram of a network hosting a virtual environment according to an exemplary embodiment.

A computer network 10 capable of supporting a three-dimensional virtual environment is illustrated in FIG. 1. The network 10 includes a plurality of end user computers terminal 12 that connect to a network 16. The network 16 may be any suitable type of system capable of interconnecting one or more end user terminals 12 with one or more servers 14. The network 16 may be but is not limited to the internet, an intranet, an extranet, Ethernet, a local-area-network, a wide-area-network, a wireless network, an optical network or a powerline network. The network 16 may use one or more network protocols, TCP/IP for example, to allow the computer terminals 12 to communicate with other computer terminals 12 or servers 14. It should be appreciated that the network 16 may also include distributed-computing methodologies wherein each computer terminal 12 is both a end user terminal and a server.

The computer terminal 12 is a suitable electronic device capable of accepting data and instructions, executing the instructions to process the data, and presenting the results. Computer terminal 12 may accept instructions through user interface, or through other means, such as but not limited to voice activation means, manually-operable selection and control means, radiated wavelength and electronic or electrical transfer. Therefore, computer terminal 12 can be a microprocessor, microcomputer, a minicomputer, an optical computer, a board computer, a complex instruction set computer, an ASIC (application specific integrated circuit), a reduced instruction set computer, an analog computer, a digital computer, a molecular computer, a quantum computer, a cellular computer, a superconducting computer, a supercomputer, a solid-state computer, a single-board computer, a buffered computer, a computer network, a desktop computer, a laptop computer, a personal digital assistant, a cell phone, or a hybrid of any of the foregoing. It should be appreciated that while only three computer terminals 12 are explicitly shown in FIG. 1, the embodiments disclosed herein are applicable to any number of computer terminals.

Also connected to the network 16 are one or more servers 14 that include executable code or software applications that may be accessed by users on the computer terminals 12. The server 14 may be connected to one or more databases 18 that store information needed by the software applications running on the server 14. A computer database 18 is a structured collection of records or data that is stored in a computer system so that a software application or person using a query language can consult it to answer queries. The records retrieved in answer to queries are information that can be used to make decisions. The software application used to manage and query a database 18 is commonly known as a database management system (DBMS). Information included in the database 18, includes but is not limited to, user account information, user preferences, product pricing, exchange rate information, billing information and the like. The database 18 may also include data related to the virtual environment 24, including but not limited to visual representations of objects, colors, sizes and geometric configurations. Software applications on the server 14 retrieve and store information in the database 18 as needed to allow a user on computer terminal 12 to conduct commercial and personal transactions and otherwise operate within a virtual environment.

The server 14 may also be connected to one or more legacy systems 20. The legacy systems 20 are typically proprietary software that is customized to meet the specific needs of a particular commercial enterprise. The legacy systems may include, but are not limited to inventory systems, enterprise resource planning systems (ERP), manufacturing resource planning systems, customer relationship management (CRM), supply chain management, purchasing systems, shipping systems, accounting systems, computer aided design systems and the like. While often legacy systems 20 were not intended to connect to network 16, many commercial enterprises continue to use legacy systems 20 due to the cost and inefficiency of porting data and rules to a new-networked solution. To adapt the legacy systems 20 to operate with server 14, there may be one or more interface software applications or computer hardware (not shown) that allows commands and information to be exchanged between the server 14 and the legacy systems 20. Further, while only one server 14, database 18 and legacy system is explicitly shown in FIG. 1, the embodiments disclosed herein are applicable to any number of servers, databases and legacy systems.

Figure 2:
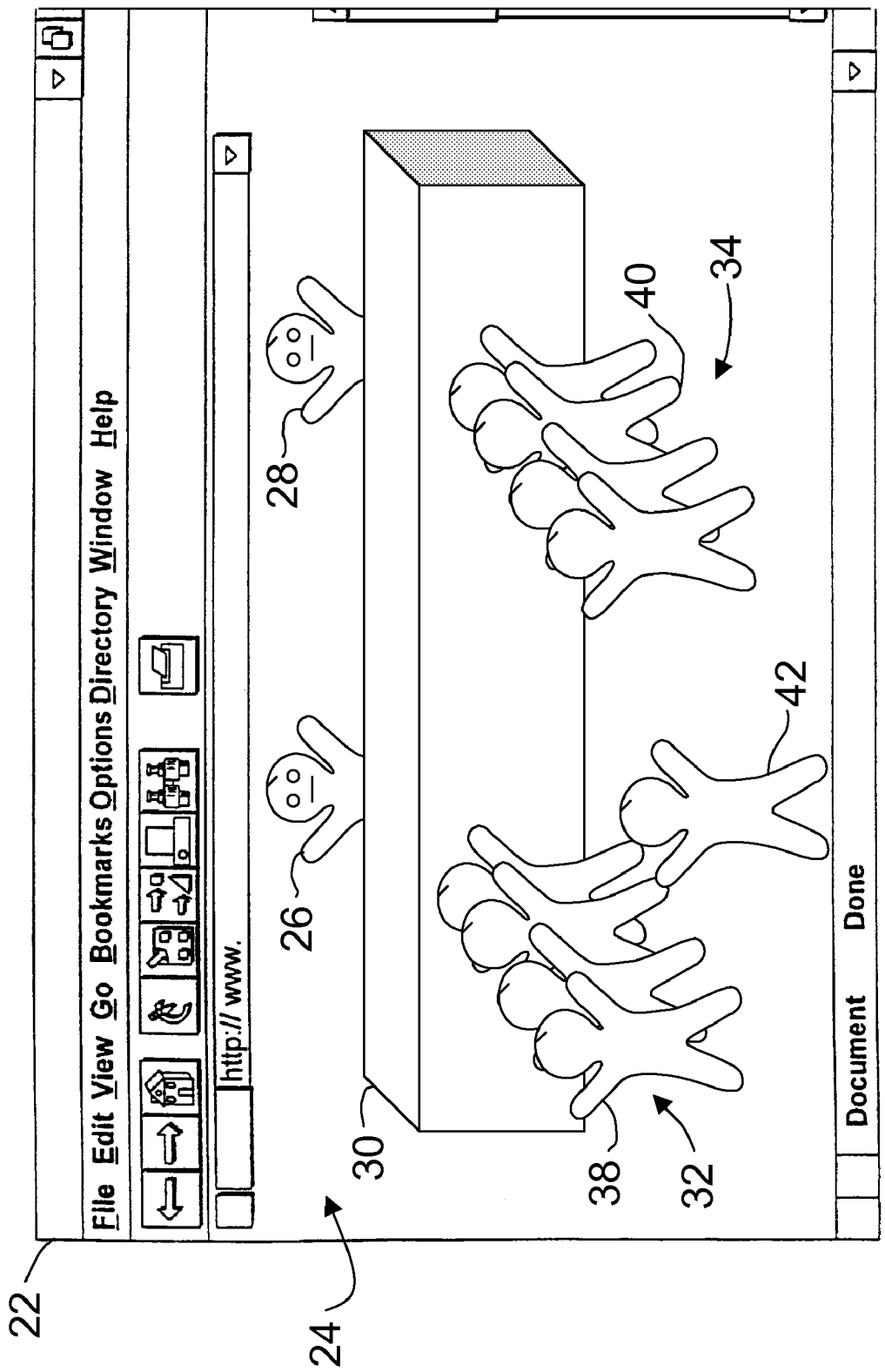
FIG. 2 illustrates a web browser window displaying a three-dimensional virtual environment that is hosted on the network of FIG. 1.

In the exemplary embodiment, the software application executing on the server 14 is a three-dimensional virtual environment 24. The end user at computer terminal 12 accesses the virtual environment on the server 14 through a software application on the computer terminal 12, such as a web browser 22 illustrated in FIG. 2 for example. It should be appreciated that while the descriptions herein refer to the general purpose software application such as a web browser 22, any other suitable type of software application that is capable of accessing the virtual environment 24, including specific purpose software for example, may be used by the end user. The web browser 22 is a graphical user interface (GUI) that provides a means for the user on the computer terminal 12 to have social and commercial interactions with other people through the virtual environment 24. In the exemplary embodiment, the virtual environment 24 is a commercial establishment including but not limited to a store or a banking institution for example. However, there is no such intended limitation of the systems and methods disclosed herein, which may be used in variety of applications and scenarios including noncommercial operations by entities such as nonprofit corporations, quasi-governmental corporations or governmental agencies.

The virtual environment 24 is a three-dimensional environment that creates a display for the end user that includes characters, or avatars, that are a representation of the users of the virtual environment. Typically, the avatars have a humanoid appearance, however, other body types such as animals may also be used. The avatars may, for example, be real end users who are interacting with the virtual environment 24 through computer terminals 12, or as will be described in more detail herein, pseudo-users that are generated by the virtual environment 24 or a server operator to interact with the actual end users. In the exemplary embodiment, the virtual environment 24 has a plurality of queue's 32, 34 that include customer avatars 38, 48. One or more server avatars 26, 28 provide services, or sell products to the avatars 38, 40 that are waiting in the queue. To create the perception of a physical world business environment, a desk or partition 30 may be included behind which the server avatars 26, 28 are located.

The server avatars 26, 28 may represent an actual person 26 who is employed by the commercial establishment, or alternatively, may be a computer-controlled avatar 28. The use of a computer server avatar 28 may be desirous to handle simple tasks or routine transactions. In this embodiment, the real person employee may assume control of the computer server avatar 28 in the event the transaction becomes too complex or an unexpected situation arises. In an alternate embodiment, all the server avatars 26, 28 are controlled by actual persons who each control multiple server avatars 26, 28 with computer assistance to allowing multiple customer avatars 38, 40 to be served at the same time.

Similar to the physical world, the server avatars 26, 28 are limited in the number of customer avatars that can be helped at any one moment in time. Where the establishment in the virtual environment 24 is popular, the amount of wait time that a customer avatar 38, 40 experiences may become undesirable. When a new customer avatar 42 arrives at the commercial establishment seeking services or the purchase of goods, the new customer 42 must first decide which queue to enter. This decision, including the decision to stay, may depend on many factors including but not limited to, the number of avatars in each queue, the perceived speed at which the avatars are moving through the queue, the number of other avatars approaching the queues, and the amount of time the new customer 42 has to spend waiting.

The commercial establishment would prefer that the new customer stay and purchase the goods and services provided. One problem in a virtual or e-commerce environment is the ease in which a potential customer can exit without making a purchase. This phenomenon is commonly referred to as an "abandoned cart." Potential customers may chose to leave or exit for a variety of reasons, including the length of time they must wait in the queue. Therefore, it is desirous for the commercial establishment to create a positive experience when the customer must wait in the queue.

Figure 3:
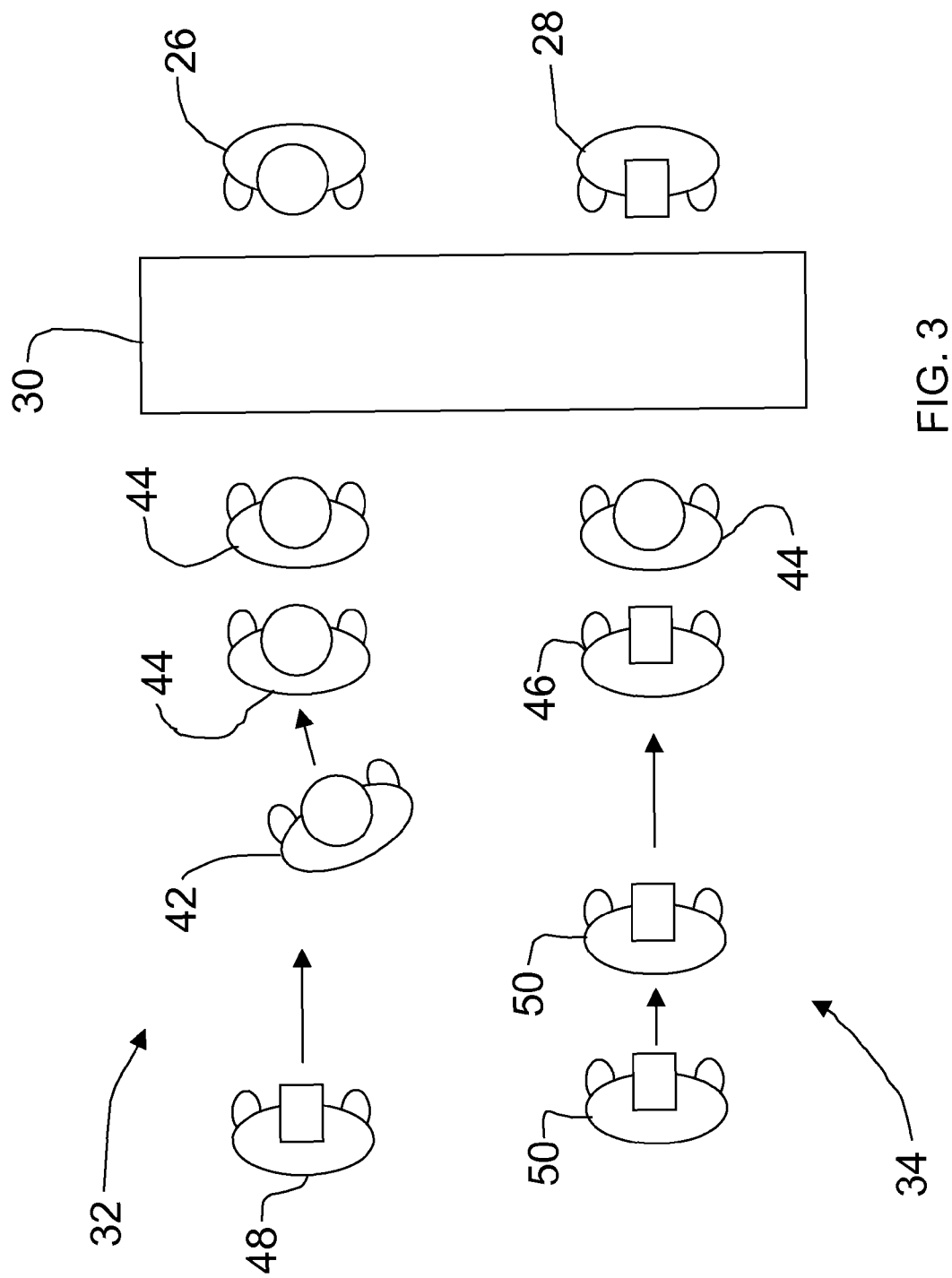
FIG. 3 illustrates a plan view of a three-dimensional virtual environment according to one exemplary embodiment.

In the embodiment illustrated in FIG. 3, the new customer avatar 42 chooses to enter queue 32. In this embodiment, the commercial establishment desires to keep an appearance that all queues have a similar number of customer avatars waiting to be served. To create this appearance, the virtual environment 24 creates a pseudo-customer avatar 46 that is controlled by the virtual environment 24. The pseudo-customer avatar 46 is then placed into the other queue 34. From the new customer avatar's 42 perception, there is no difference and the new customer avatar 42 can not distinguish between a real customer avatar 44 an a pseudo-customer avatar 46. In an alternate embodiment, the virtual environment may add extra pseudo-customer avatars 46 to the queue being served by the real person server avatar 26 to encourage the new customer avatar 42 to wait in the queue being served by the computer server avatar 28, which will then appear to be shorter.

To further discourage the new customer avatar 42 from leaving the queue, the virtual environment 24 creates additional pseudo-avatars 50 that appear and enter the other queue 34. To the new customer avatar 42, this creates the appearance that they entered the shorter queue that will allow them to conduct their transaction the fastest. To further encourage the new customer avatar 42 to stay, the virtual environment 24 creates another pseudo-avatar 48 that enters the queue 32 behind the new customer avatar 24. This helps create the perception that the commercial establishment is busy and encourages the new customer avatar 42 to stay and wait since the queues could be longer later. It should be appreciated that since the virtual environment 24 controls the display that the end user on computer terminal 12 sees, the pseudo-avatars 46, 48, 50 may, or may not be visible to other addition new customer avatars that enter the virtual commercial establishment using a different computer terminal 12.

Figure 4:
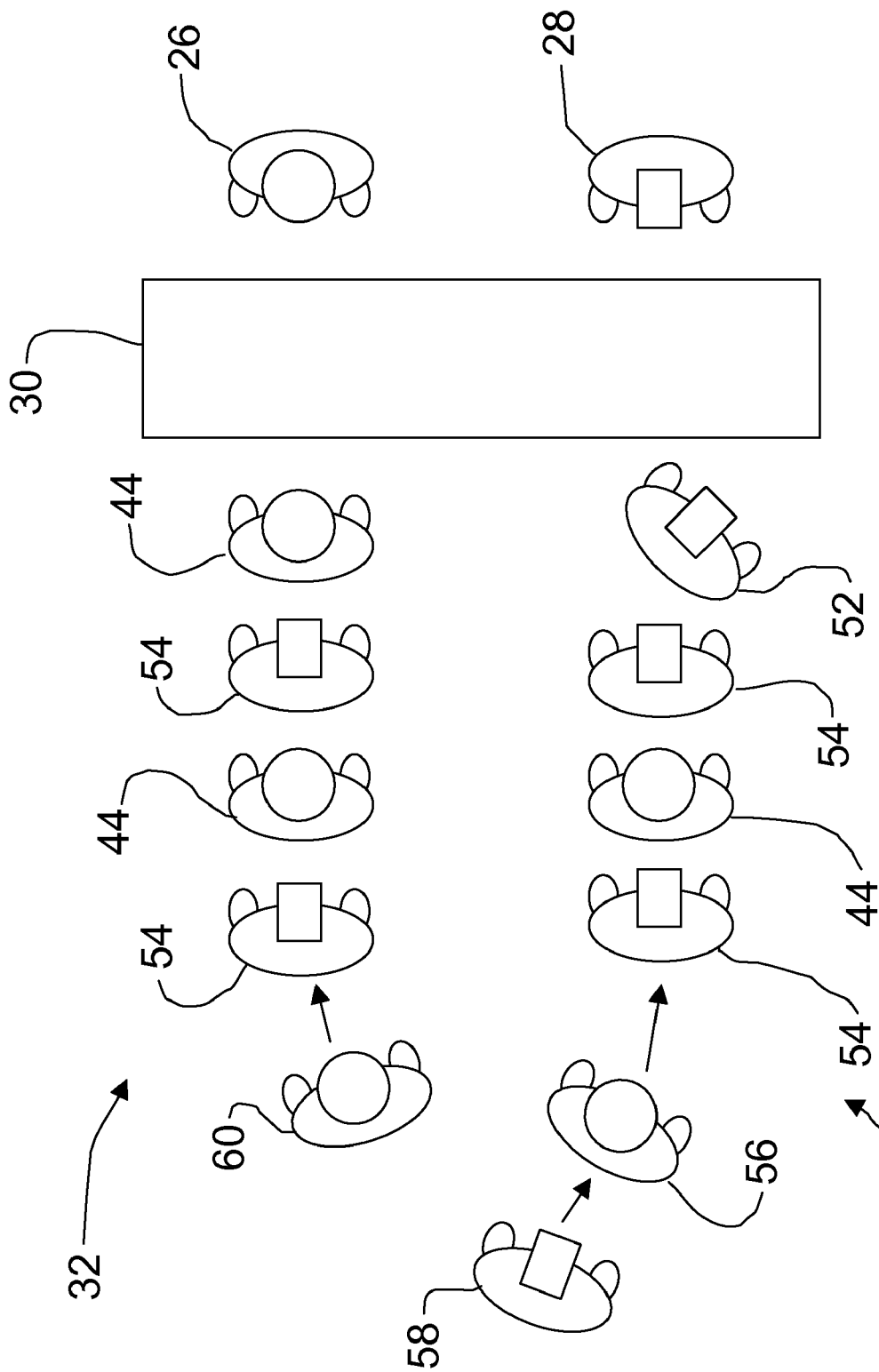
FIG. 4 illustrates a plan view of a three-dimensional virtual environment according to another exemplary embodiment; and, FIG. 5 illustrates a plan view of a three-dimensional virtual environment according to another exemplary embodiment.

In an alternate embodiment illustrated in FIG. 4, the commercial establishment desires to create the perception that even though the queues may be long, the wait time will be short since other avatars are quickly concluding their transactions and exiting. To create this perception, as a new customer avatar 56 approaches the queues 32, 34 a pseudo avatar 52 exits queue 34 decreasing the number avatars in queue 34. Since additional pseudo-avatars 54 are interspersed with real customer avatars 44, the virtual environment 24 can speed up and slow down the length of wait in the queue. This may be desirous, for example, if the commercial establishment only has a limited number of real person server-avatars 26 that are assisting customers. Where a particularly difficult transaction or situation arises, the virtual environment may slow the speed of the other queues to allow the real person server-avatar to conclude the difficult transaction.

This embodiment may be combined with the methods used in the embodiment illustrated in FIG. 3. To encourage the new customer-avatar 56 to wait in the queue 34, another pseudo avatar 58 is created and added to queue 34 behind the new customer avatar 56. This also assists in keeping the length of the queues 32, 34 approximately equal so as additional new customer avatars 60 arrive, the other queue 32 will appear to be shorter and the more desirous queue to wait in.

In addition to the creation of pseudo avatars, the virtual environment 24 may also use other techniques to encourage new customer avatars to wait in queue, or select one queue over another. In an alternate embodiment, the database 18 includes a set of parameters related to each customer avatars preferences. Such preferences may include features that the customer avatar desires in a server avatar or a commercial establishment. For example, such parameters may include but are not limited preferences on the lighting, wall color and room size and the server avatar's gender, species, age, hair color, eye color, height, and weight.

In this embodiment, when the new customer avatar enters the virtual commercial establishment, the new customer avatar's preferences are queried in the database 18. The desired parameters are returned and virtual environment 24 changes the server avatar and the surroundings to match those desired by the customer avatar. For example, a particular customer avatar may enjoy being served by a distinguished older gentleman with gray hair. In this instance, the virtual environment 24 would change the appearance of the server avatar to match these preferences. Additionally, where there are multiple queues, the virtual environment 24 may determine which queue it desires the customer avatar to chose and only change the appearance of the server avatar helping that queue.

Figure 5:
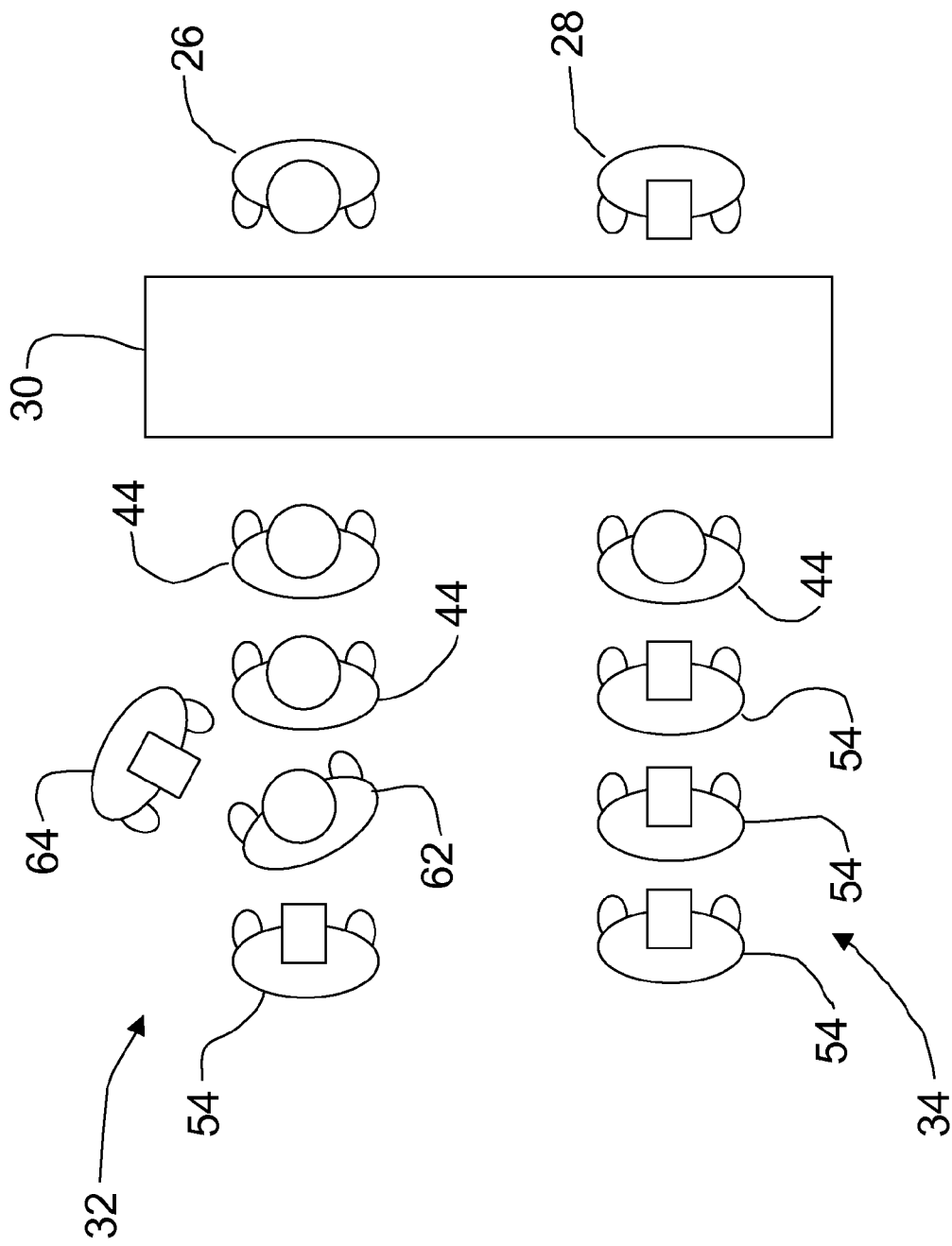

In the alternate embodiment illustrated in FIG. 5, the virtual environment 24 uses other methods to improve the experience of the customer avatar while waiting in queue. In this embodiment, the new customer avatar 62 enters into the queue 32 that already includes other customer avatars 44. As described above, the virtual environment 24 adds additional pseudo avatars 54 to create the perception for the new customer avatar 62 that they have chosen the correct queue and that the queues continue to move quickly. The virtual environment 24 then introduces a new conversational avatar 64 to the environment.

The conversational avatar 64 approaches the new customer avatar 62 and seeks to engage the new customer avatar 62 in a discussion. By distracting the new customer avatar 62, the perception will be created that the amount of time the new customer avatar 62 has spent in the queue will be less. Further, by engaging the new customer avatar 62 in discussion, the new customer avatar is less likely to exit the queue and the commercial establishment. In an alternate embodiment, the database 18 includes information on the new customer avatar's 62 interests and this information is queried prior to the conversation avatar 64 approaching the new customer avatar 62. Thus the conversational avatar 64 can engage in discussions that the new customer avatar 62 is interested in, thus improving the users queue experience.

The capabilities of the embodiments disclosed herein can be implemented in software, firmware, hardware or some combination thereof. As one example, one or more aspects of the embodiments disclosed can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the disclosed embodiments can be provided.

The diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

While exemplary embodiments have been described, it will be understood that those skilled in the art, both now and in the future, may make various improvements and enhancements which fall within the scope of the claims which follow. These claims should be construed to maintain the proper protection for the invention first described.

What is claimed is:

1. A method for improving the experience of a user waiting in a queue in a three-dimensional online environment, the method comprising:

defining a visual three-dimensional virtual environment having avatars representing human customers, computer customers, human servers and computer servers defining a plurality of queues in the virtual environment, wherein each queue includes a group of human customer avatars, computers customer avatars;

detecting a new customer avatar entering one of the queues;

determining the number of avatars ahead of the new customer avatar in the selected queue; and adding computer avatars to the non selected queues such that the non-selected queues have more avatars than the queue selected by the new customer avatar to create the perception that the selected queue will have a shorter wait time.

2. The method of claim 1 further comprising the step of adding computer avatars to the selected queue behind the new customer avatar.

3. A method for improving the experience of a user waiting in a queue in an virtual environment, the method comprising:

providing a virtual environment having at least two queues;

detecting a new user avatar entering the virtual environment;

determining the new user avatar's preferences;

providing a server avatar for each queue wherein the visual appearance of at least one of the server avatars matches the new user avatar's server preference;

allowing the new user avatar to select a queue; and, adding computer avatars to the non-selected queue until the non-selected queue has more human customer avatars and computer avatars than the selected queue.

4. A method for improving the experience of a user waiting in a queue in an online environment, the method comprising: defining a visual three-dimensional virtual environment having avatars representing human customers, computer customers, human servers and computer servers defining a plurality of queues in the online environment, wherein each queue includes a group of human customer avatars, computers customer avatars; detecting a new customer avatar entering one of the queues; defining a conversational computer avatar; and initiating communication between the new customer avatar and the conversational avatar; determining the number of avatars ahead of the new customer avatar in the selected queue; adding computer avatars to the non selected queues such that the non-selected queues have more avatars than the selected queue; and, adding one or more computer avatars to the selected queue behind the new customer avatar.

* * * * *